(No Model.)
E. HAMMESFAHR.
BELT SUSPENDING DEVICE.
No. 478,260. Patented July 5, 1892.
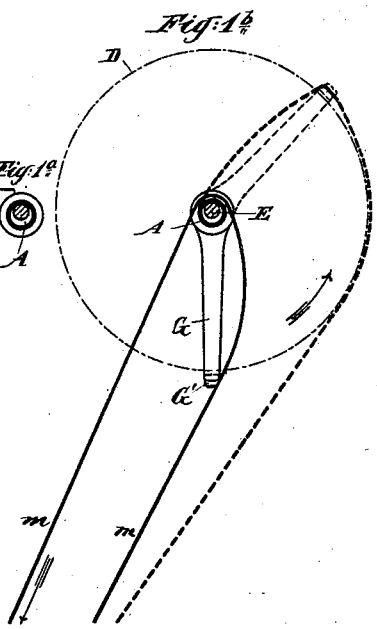
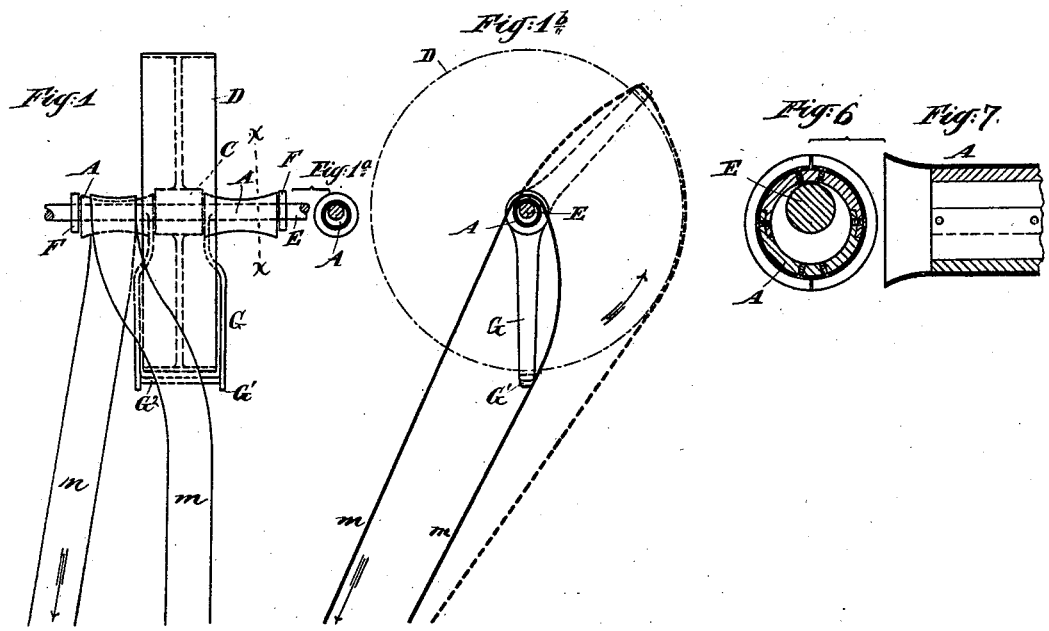
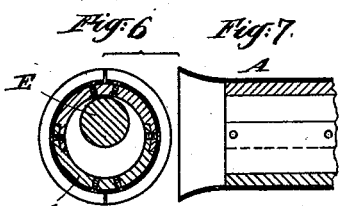
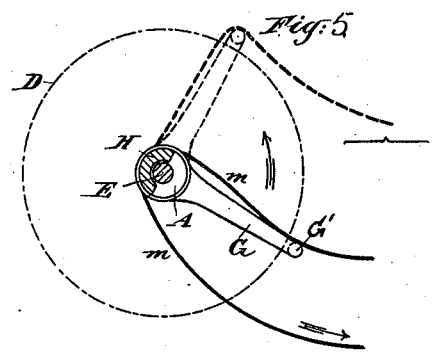
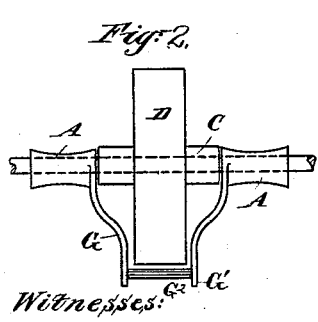
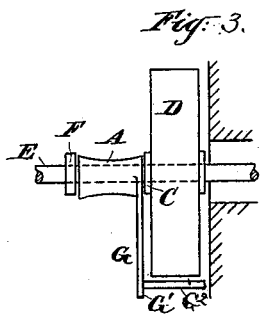
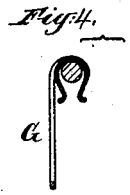
Witnesses:
M. F. Boyle,
Charles R. Searle.
Inventor:
Ernst Hammesfahr
by his attorney
Thomas Drew Stetson
THE NORRIS PETERS CO., PHOTO-LITHO., WASHINGTON, D. C.

UNITED STATES PATENT OFFICE.

ERNST HAMMESFAHR, OF SOLINGEN, GERMANY.

BELT-SUSPENDING DEVICE.

SPECIFICATION forming part of Letters Patent No. 478,260, dated July 5, 1892.

Application filed March 4, 1891. Serial No. 383,674. (No model.)

*To all whom it may concern:*

Be it known that I, ERNST HAMMESFAHR, a subject of the Emperor of Germany, residing in Solingen-Foche, in Rhenish Prussia, Germany, have invented a certain new and useful Improvement in Belt-Supporting Devices, of which the following is a specification.

The device is intended more especially for use with pulleys of moderate size and belts of moderate width; but the invention is not confined in these respects. I mount on the shaft adjacent to the pulley a sleeve, applying closely against the nave of the pulley on one side, or preferably on both sides, and of sufficient width to support the belt. Their exteriors are concaved, so that the belt will be securely guarded against sliding off. When the belt is put out of use by being thrown off from the pulley, instead of hanging on the shaft and being subject to friction against the shaft or against the edges of the pulley-rims or against the arms or nave of the pulley, it hangs on my sleeve, and is thus protected from friction. The device tends to prevent the belt from becoming entangled with the pulley or shaft or from being worn by friction of any of the parts when out of use. I provide an arm reaching outward from my sleeve or sleeves and extending across the face of the pulley adapted to receive the belt and aid in placing it again upon the pulley.

The accompanying drawings form a part of this specification.

Figure 1 is a side elevation; Fig. 1$^a$, a cross-section on the line $xx$ in Fig. 1. Fig. 1$^b$ is an elevation of the belt and one of my sleeves seen at right angles to the position in Fig. 1. Fig. 2 is an elevation showing a still wider form of the device. Fig. 3 is an elevation showing a single sleeve on one side of the pulley, with a corresponding modification of the arm. This form is adapted to serve where the pulley must run close to an object, as another pulley or a wall. Fig. 4 is a section showing what I term an "open sleeve," serving in place of the closed sleeve. Fig. 5 is an end elevation showing the mode adapted for balancing the weight of the arms with their cross-bar and horns. Figs. 6 and 7 are sections on a larger scale, showing my sleeve made up of separate pieces. Fig. 7 is a vertical section transverse to the axis. Fig. 8 is a longitudinal section of the sleeve without the axis.

Similar letters of reference indicate corresponding parts in all the figures where they appear.

Referring to Fig. 1, A A are loose sleeves mounted upon the shaft E, adjacent to the hub or nave C of the pulley D. A collar F is fixed on the shaft exterior to each sleeve. G is a brace or arm attached to the inner end of one sleeve, extending out to the periphery of the pulley D, then across the face thereof, as indicated by $G^2$, and inward to connect to the inner end of the other sleeve. Horns or extensions G' G' at the angles serve an important end in aiding to hold the belt on the arm when it is to be reapplied upon the pulley. The belt is marked $m$. To replace the belt on the pulley, the belt is engaged with the arm between the horns G' G', as shown in Fig. 1, and the arm carrying the belt is moved around in the obvious manner, either by the force of the hands applied directly or indirectly or by other suitable means. So soon as the belt has commenced to bear on the pulley the friction of the pulley aids the operation in the same manner as in any belt placing. The attendant can aid the movement by pulling downward forcibly on the other part of the belt in the direction of the arrow in Fig. 1. The force thus applied contributes to the turning of the sleeves and their attached arm in the desired direction. It also increases the friction of the sleeve with the shaft and makes the motion of the shaft conduce to the desired end.

Fig. 1$^b$ shows the device in strong lines with the belt out of use and in dotted lines in the act of replacing the belt upon the pulley.

Fig. 5 shows the invention with the belt led away horizontally. This is the condition which obtains when the belt communicates the motion from one shaft to another at or about the same level. It is important that the arm be retained in the idle condition within the belt when the belt is running. The gravity of the arm tends to incline it downward. Fig. 5 shows the opposite side of the sleeve counterweighted, H being the counter-weight, to such an extent as nearly or quite balances the gravity of the arm and allows it to stand in any position indifferently.

If the belt extended upward from the pulley to which this invention is applied, as is the case if this is the driving-shaft and the machine or counter-shaft which is to be driven is above it, then the counter-weight should be heavier, so as to incline the arm G to stand upright.

The sleeves A may be made each of a single piece of material, or they may be made of two or more pieces, with divisions for connecting and disconnecting them. Such compound construction facilitates the application and removal, so that in some situations it is preferable. Figs. 7 and 8 show such a compound construction, the exterior of the sleeve being of metal in two parts and the lining of the sleeve being of other material, as hard wood saturated with oil, the wood being correspondingly in two pieces and applied together, so as to break joints. In this form of the invention screws are liberally used to hold the parts together. When it is desired to detach the parts from each other, and thus to remove the sleeve from the shaft or to apply a new one, the screws can be inserted and removed in the obvious manner. The invention may be applied either to the driving or the driven pulley, or it may in some situations be applied to both.

I claim as my invention—

The shaft E, pulley D, and two loose sleeves concaved, as shown, in combination with each other and with two arms G, connected to the sleeves and across the outer face of the pulley and provided with two horns G', all arranged for operation relatively to each other and to a belt $m$, as herein specified.

In testimony whereof I have hereunto set my hand, at Berlin, this 21st day of January, 1891, in the presence of two subscribing witnesses.

ERNST HAMMESFAHR.

Witnesses:
PAUL KÜHNE,
WILHELM GROTSCH.